(12) United States Patent
Mickelson et al.

(10) Patent No.: US 7,673,699 B2
(45) Date of Patent: *Mar. 9, 2010

(54) SWAY RESTRICTOR BRACKET FOR A DRAFT LINK OF A THREE POINT HITCH

(75) Inventors: Roger D. Mickelson, West Burlington, IA (US); Robert E. Mozingo, Burlington, IA (US); Ralph D. Galloway, Burlington, IA (US); Marvin L. Linder, Carman, IL (US)

(73) Assignee: CNH America LLC, New Holland, PA (US)

( * ) Notice: Subject to any disclaimer, the term of this patent is extended or adjusted under 35 U.S.C. 154(b) by 6 days.

This patent is subject to a terminal disclaimer.

(21) Appl. No.: 11/942,215

(22) Filed: Nov. 19, 2007

(65) Prior Publication Data

US 2008/0060826 A1  Mar. 13, 2008

Related U.S. Application Data

(62) Division of application No. 11/217,631, filed on Aug. 31, 2005, now Pat. No. 7,377,330.

(51) Int. Cl.
*A01B 63/02* (2006.01)
(52) U.S. Cl. ..................................... 172/450
(58) Field of Classification Search ................. 172/439, 172/450, 275, 133, 443, 272, 273, 827, 451, 172/449, 457, 677, 422, 445.2, 445.1; 37/231, 37/232; 280/455.1, 497, 124.106; 248/226.11, 248/214, 229.16, 229.25, 229.22; 16/DIG. 2
See application file for complete search history.

(56) References Cited

U.S. PATENT DOCUMENTS

| 805,422 | A | * | 11/1905 | Hogan | 182/115 |
| 2,051,531 | A | * | 8/1936 | Roberts | 49/460 |
| 2,746,770 | A | * | 5/1956 | Sorensen et al. | 172/449 |
| 2,935,145 | A | * | 5/1960 | Du Shane et al. | 172/275 |
| 3,476,346 | A | * | 11/1969 | Oakes | 5/430 |
| 4,268,057 | A | * | 5/1981 | Engelmann et al. | 280/474 |
| 5,109,618 | A | * | 5/1992 | Grubler et al. | 37/232 |
| 5,228,737 | A | * | 7/1993 | Zimmerman | 296/76 |
| 5,588,166 | A | * | 12/1996 | Burnett | 5/503.1 |
| 2005/0023421 | A1 | * | 2/2005 | Wood et al. | 248/226.11 |
| 2006/0096766 | A1 | * | 5/2006 | Warlick | 172/450 |

* cited by examiner

*Primary Examiner*—Robert E Pezzuto
*Assistant Examiner*—Matthew D Troutman
(74) *Attorney, Agent, or Firm*—Patrick M. Sheldrake; John William Stader; Michael G. Harms

(57) ABSTRACT

The sway restrictor includes a bracket attachable between the draft link or arm and an adjacent upwardly and downwardly extending structural element of a work machine, and is operable for substantially restricting or preventing relative sideward movement therebetween, particularly swaying of the hitch, while allowing relative upward and downward movements thereof, including tilting movements.

5 Claims, 4 Drawing Sheets

SWAY RESTRICTOR BRACKET FOR A DRAFT LINK OF A THREE POINT HITCH

This divisional application claims priority under 35 U.S.C. §120 from U.S. patent application Ser. No. 11/217,631 filed on Aug. 31, 2005, now U.S. Pat. No. 7,377,330 by Roger D. Mickelson et al. with the same title, the full disclosure of which is hereby incorporated by reference.

TECHNICAL FIELD

The present invention relates to a three point hitch for a work machine such as a tractor used for construction, earth moving, agriculture, and other purposes, and more particularly, to a sway restrictor including a compact bracket attachable between a draft link or arm and an adjacent upwardly and downwardly extending fixed structural element of a work machine and operable for substantially restricting or preventing relative sideward movement therebetween, particularly swaying of the hitch, while allowing relative upward and downward movements thereof, including tilting movements.

BACKGROUND ART

Work machines such as tractors often include three point hitches for supporting and towing tools and implements, such as scrapers, blades, sprayers, and the like. For many applications, it is required or desired to have the ability for the towed tool or implement to closely follow a desired or predetermined path, such as an edge or boundary of an area to be scraped, for instance, the edge of a soil area next to a foundation, and where exceeding the boundary is undesirable or can possibly cause damage such as that which could result from contact between a scraper or blade and a foundation or wall. However, such three point hitches typically utilize draft links or arms for supporting and connecting to the lower portions of a tool or implement. The vertical position of the draft links is typically individually precisely controllable using fluid cylinders connected between the draft links and the work machine, but the connections allow generally free relative side to side movements of the draft links and the work machine over a relatively large amount of travel. Some sideward movement is required for hitches for construction and landscaping applications wherein the draft links are individually vertically movable by separate cylinders, so as to effect and facilitate sideward tilting of a scraper or blade. However, such side to side freedom of movement permitted by known hitches also allows swaying of the tool or implement and a resultant difficulty in maintaining precise side to side positioning thereof, for instance, for alignment with an edge or boundary of an area being worked by the tool or implement, such as soil area being landscaped adjacent to a foundation or wall.

To substantially limit or prevent such swaying, it is known to provide blocks which may be mounted in one or more alternative orientations or positions on a work machine or draft link, for preventing sway in one direction only. Such blocks are advantageous as they are relatively compact and allow close spacing between a wheel of a tractor and a draft link, but a disadvantage is that the blocks are required to be used in association with both of the draft links to prevent swaying in both sideward directions. Reference in this regard, Slosiarek et al. U.S. Pat. No. 3,847,228, issued Nov. 12, 1974 to Allis-Chalmers Manufacturing Company; and Teich U.S. Pat. No. 4,640,522, issued Feb. 3, 1987 to Deere & Company. As another disadvantage, a problem that can arise when using such blocks with a sidewardly tiltable hitch is that at least one of the draft links would have to be allowed to move sidewardly to accommodate sideward tilting movement, which would also allow at least some of the sideward swaying not desired for the reasons discussed above.

As an alternative, a variety of single arms and struts have been developed for connection between a structural element of a work machine and one of the draft links of a three point hitch, to provide bi-directional limitation of movements of the draft link, to thereby attempt to eliminate the need for devices such as blocks in association with each of the draft links. Reference in this regard, Kunze U.S. Pat. No. 4,203,613, issued May 20, 1980 to Jean Walterscheid GmbH; and Lang U.S. Pat. No. 4,265,464, issued May 5, 1981 to Deere & Company. However, devices such as these suffer from shortcomings including requirements for multiple pivotal connections, complexity, large size and space requirement, and relatively high cost.

Thus, what is sought is a sway restricting apparatus which facilitates sideward tilting of a hitch, and overcomes one or more of the problems and/or disadvantages set forth above.

SUMMARY OF THE INVENTION

What is disclosed is a sway restrictor for a draft link of a three point hitch for a work machine such as a tractor, which overcomes one or more of the problems and/or disadvantages set forth above.

According to a preferred aspect of the invention, the sway restrictor includes a generally C-shaped bracket having a first leg portion and a second leg portion spaced from the first leg portion and defining a space therebetween adapted for cooperatively receiving an upwardly and downwardly extending structural element of a work machine therein. The bracket is preferably of cast or forged metal, heavy duty construction. The structural element can include, for instance, but is not limited to, a generally vertically extending fixed edge or lip of a structural member such as a frame member, transmission housing or axle housing, and also should be of strong construction. The three point hitch can be located on a rear end, or a front end, of a work machine, and the edge or lip will preferably face the same direction as the draft links of the hitch. With the structural element received in the space of the bracket, an inner surface of the first leg portion of the bracket will face a first side of the structural element, and an inner surface of the second leg portion will face a second side of the structural element opposite the first side. One of the leg portions preferably has a passage or cavity therein extending in a sideward or transverse direction generally toward the other of the leg portions, so as to be in connection with the space. The sway restrictor includes at least one mounting element adapted for mounting the bracket on a draft link of a three point hitch mounted on a work machine such that the selected upwardly and downwardly extending structural element thereof will be cooperatively received in the space. The restrictor includes at least one wear pad disposed in the passage in connection with the space, so as to be extendible into the space, and an adjusting element adjustably movable in cooperation with the wear pad for adjustably holding the wear pad in a position extending into the space, for restricting relative transverse movement of the draft link and the structural element cooperatively received in the space.

According to another preferred aspect of the preferred invention, the adjusting element can be adjustably moved to position the wear pad in abutting contact with the adjacent side of a structural element, such that the inner surface of the other leg portion of the bracket abuts an opposite side of the structural element, to thereby limit or effectively prevent transverse sway of the draft link as well as other portions of the three point hitch, even under high loading conditions such as experienced while using a soil scraper or blade, while still allowing relative vertical movements of the hitch and work machine.

As a result, undesired transverse or side sway or movements of a tool or implement towed by the work machine using the hitch can be substantially eliminated or reduced to a desired or required extent, thereby facilitating the ability of the tool or implement to closely follow a predetermined path, such as an edge or boundary of a soil area being landscaped located next to a foundation or wall.

According to another preferred aspect of the invention, the bracket is mountable on a draft link using suitable conventional fasteners, such as bolts or the like, and the adjusting element includes a threaded member threadedly engaged with the bracket or draft link in a position for bearing against the adjustable wear pad.

According to another preferred aspect of the invention, an inner surface of the leg includes a second wear pad, and one or both of the opposite sides of the structural element include wear pads, respectively, positioned so as to extend along a path of upward and downward movement of the draft link, for abutting the wear pad or pads on the bracket and providing oppositely facing surfaces over which they can travel or slide.

As an advantage of the bracket of the invention, setup and adjustment time are greatly reduced. Complexity and size of the apparatus for restricting sway are both also substantially reduced. As a result, the bracket has utility for use on small and compact classes of tractors and other work machines, and on larger tractors where the tires are spaced close together. As another advantage, the adjusting element can be easily and conveniently positioned for providing a desired amount of allowed sway, including essentially no sway, as desired or required for a particular application. The adjustability of the wear pad also allows compensating for wear as it occurs, such that a desired amount of permissible sway, or no substantial sway, can be maintained for a substantial period of time without requiring replacement of parts and the like.

As a still further important advantage, the restrictor prevents sideward swaying of the hitch, while still allowing the other of the draft links to move sidewardly, for facilitating independent upward and downward movements of the draft links necessary for sideward tilting movements of a tool or implement mounted on the hitch.

DETAILED DESCRIPTION OF THE INVENTION

Figure 1:
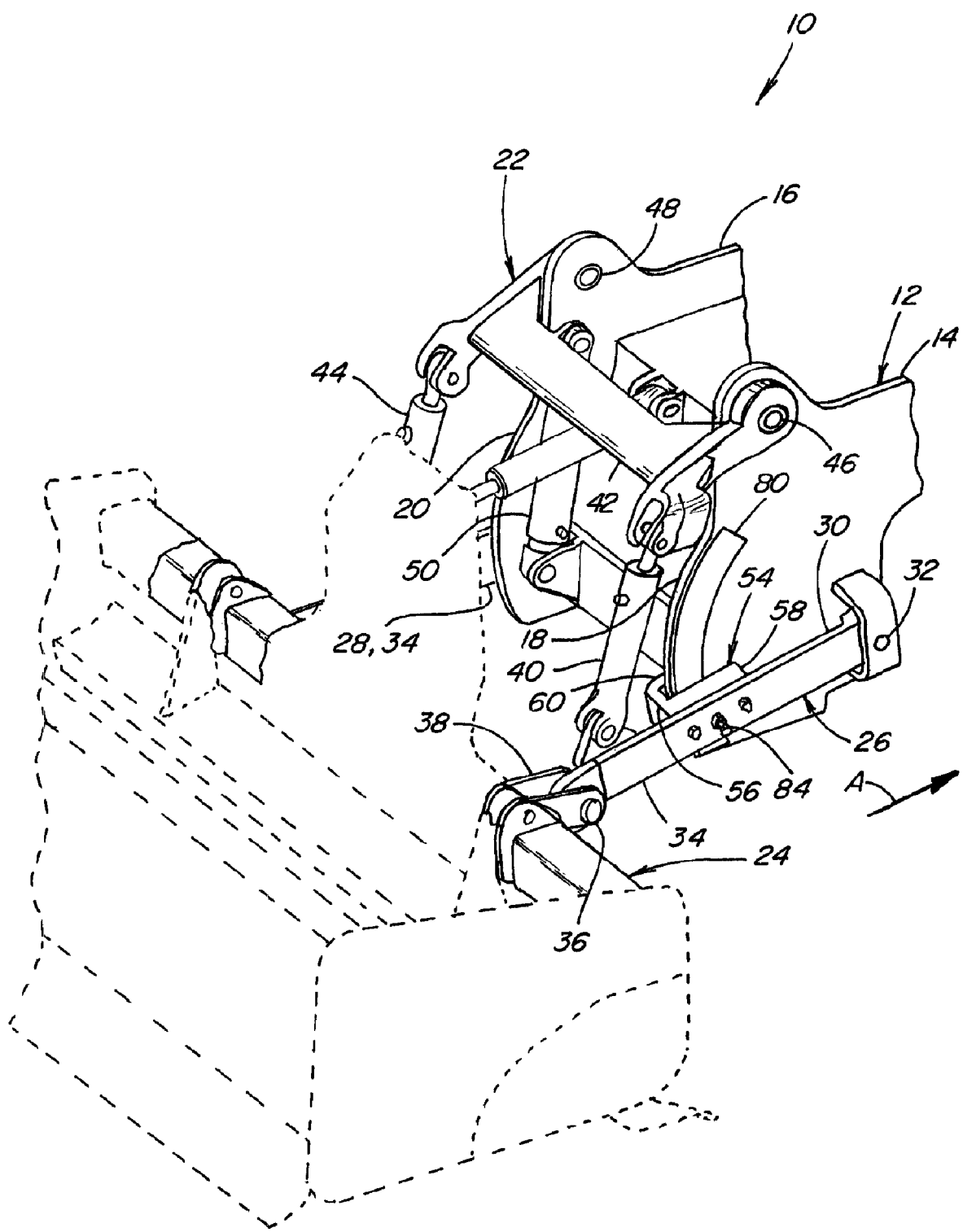
FIG. 1 is a fragmentary perspective view of a rear end of a work machine representative of a tractor used for construction purposes, including a three point hitch and a sway restrictor of the invention installed thereon, and showing partially in dotted lines, a conventional soil scraper used for landscaping and the like, mounted on the hitch.

Referring now to the drawings, in FIG. 1, a rear end of a conventional work machine 10 is shown, work machine 10 being intended to be representative of a wide variety of work machines such as a tractor, used for purposes such as construction, landscaping, agriculture, and the like. Work machine 12 includes a rear frame 12, which can be a weldment, casting or other member or structure of heavy-duty construction, including at least one and possibly a pair of spaced apart structural elements 14 and 16, comprising upwardly and downwardly extending side plates including generally arcuate, upwardly and downwardly extending rear edge portions 18 and 20, respectively. Structural elements 14 and 16 support a three point hitch 22, which, in turn, is capable of supporting any of a wide variety of tools and implements, such as a soil scraper 24 shown. Essentially, in operation, scraper 24 is supported on three point hitch 22 at a desired elevation in relation to the soil, and pulled or towed in a forward direction, denoted here generally by arrow A, for scraping and holding soil for later deposition on the ground. Scrapers, such as scraper 24, are commonly used in landscaping and other construction applications for leveling soil next to structures, such as walls, foundations, and the like, wherein it is desirable to tow the scraper as close as possible to the wall or foundation for working the soil in that area. A scraper such as scraper 24 may also be forwardly or rearwardly tilted for more or less aggressive scraping action, and may be sidewardly tilted to enable forming the sides of ditches, swails, and the like.

Three point hitch 22 generally includes a pair of draft links, including a first draft link 26 and a second draft link 28. Each of the draft links 26 and 28 includes a mounting end portion 30 which is mounted to, or adjacent to, one of the structural elements of rear frame 12, for pivotal upward and downward movement of a free end 34 thereof, as illustrated by pivotal mounting of mounting end portion 30 of first draft link 26 to structural element 14 by pivot pin 32. A tool or implement, here represented by soil scraper 24, is attached to free end portions 34 of draft links 26 and 28, by pins 36 which extend through holes through free end portions 34 and devises 38 on scraper 24. Free end portion 34 of first draft link 26 is pivotally connected to a lower end of a first tilt cylinder 40, the upper end of cylinder 40 being pivotally connected to one end of a rocker shaft 42. Similarly, free end portion 34 of second draft link 28 is connected to a second tilt cylinder 44 which is also connected to rocker shaft 42. First and second tilt cylinders 40 and 44 are individually extendible for adjusting a vertical pivotal position of the respective free end portions 34, for effecting sideward tilting of the hitch and a tool or implement connected thereto such as scraper 24. Rock shaft 42, in turn, is pivotally connected by pins 46 and 48 to structural elements 14 and 16, respectively, so as to be vertically pivotable in relation thereto, as controlled by a main lift cylinder 50, for adjusting an overall vertical height or elevation of a tool or implement mounted on three point hitch 22, such as soil scraper 24, as desired or required for a particular application. A centrally located center link of the hitch also connects to a center portion of a tool or implement, and is movable by another cylinder to effect forward and rearward tilting of the tool or implement. Also, as an alternative it should be understood that hitch 22 may be equipped with only one tilt cylinder for effecting sideward tilting movements.

Figure 6:
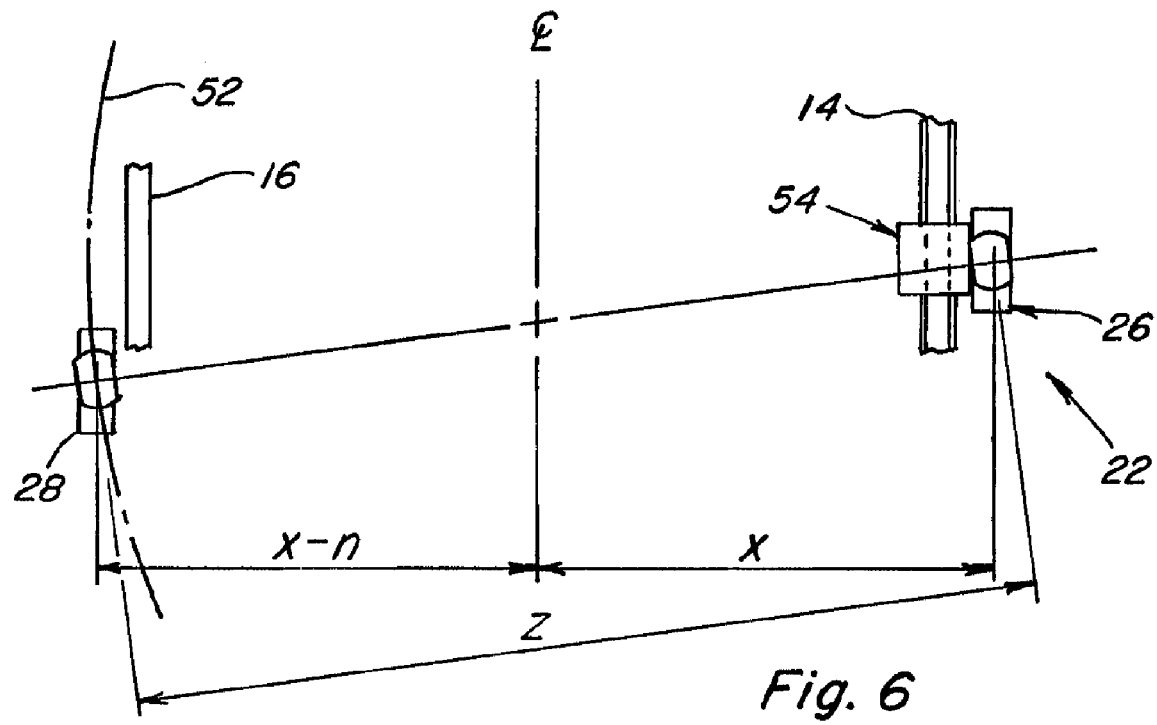
FIG. 6 is another simplified schematic rear view of the hitch and restrictor, with the hitch tilted, to show an advantage of the restrictor.

Here, referring also to FIG. 6, it should be understood that when free end portions 34 of draft links 26 and 28 are connected to a tool or implement, such as scraper 24, the sideward spacing between free end portions 34 of the draft links 26 and 28 is substantially fixed, or variable only by a small amount. As a result, when draft links 24 and 26 are positioned at different heights for effecting tilting of a tool or implement, at least one of the draft links must be allowed to move sidewardly relative to the adjacent structural element. This is illustrated by arcuate line 52 in FIG. 6. However, for many applications, for instance, when scraping soil next to a wall or foundation, it is desirable to have the capability for preventing any substantial or significant side-to-side movement or swaying of a scraper such as scraper 24, such that the wall or foundation is not inadvertently contacted or impacted so as to possibly damage the scraper and/or wall or foundation, and such that areas closely adjacent to the wall or foundation are not missed during the scraping operation or path. It is also desirable that any apparatus that provides such capability of preventing or substantially restricting swaying movements of a tool or implement, such as scraper 24, allow the required movement of at least one of the draft links 26 and 28, to allow effecting sideward tilting thereof, without subjecting components of the hitch, work machine, and/or tool or implement, to undue stress or wear. Still further, it is also desirable for any such apparatus to be strong and durable, yet compact and simple in construction.

Figure 2:
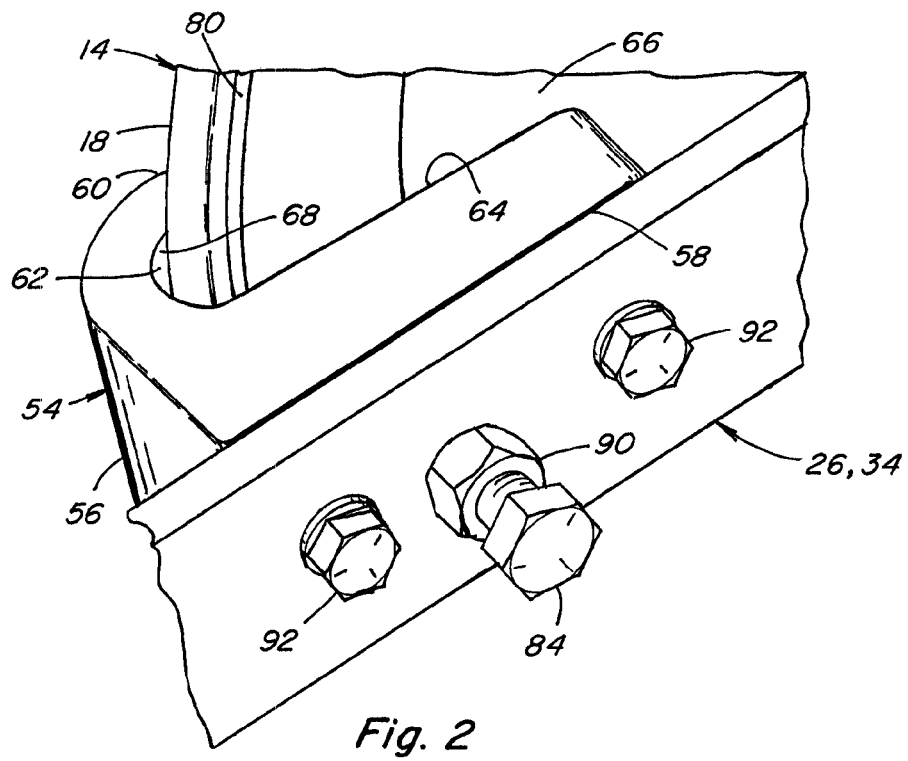
FIG. 2 is an enlarged fragmentary perspective view of a draft link of the three point hitch and sway restrictor of FIG. 1, showing a structural element of the work machine received in a bracket of the sway restrictor.
Figure 3:
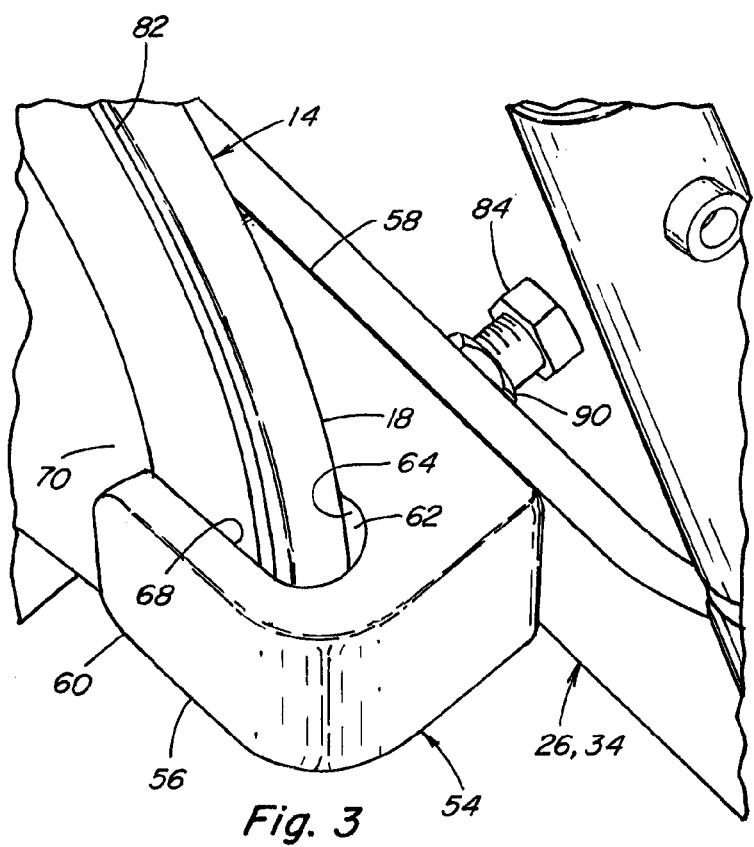
FIG. 3 is another enlarged fragmentary perspective view of the draft link and sway restrictor in association with the structural element.
Figure 4:
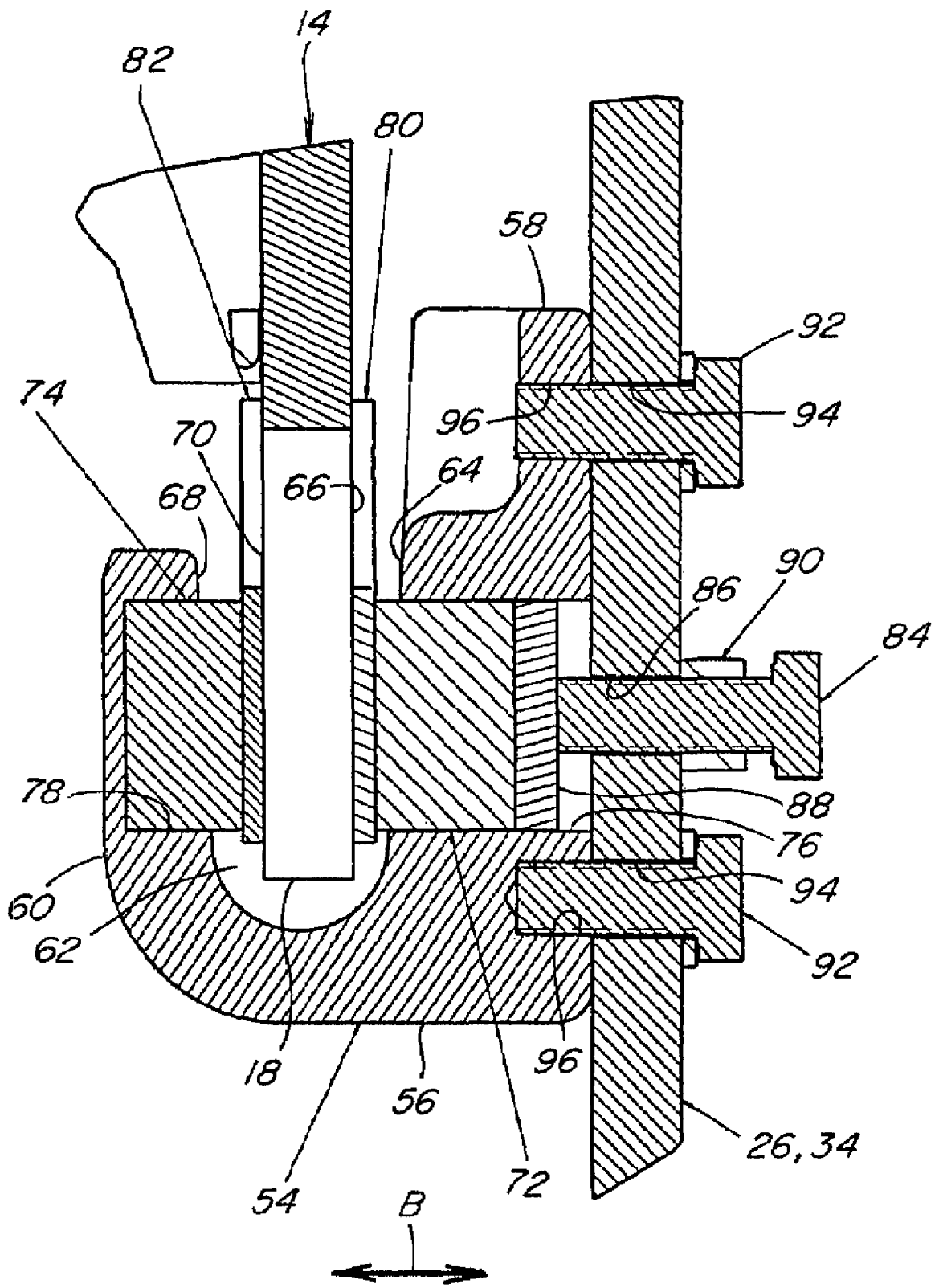
FIG. 4 is a sectional representation of the sway restrictor mounted on the draft link and engaged with the structural element of the work machine, illustrating internal aspects of the restrictor.

Referring also to FIGS. 2, 3 and 4, a sway restrictor 54 constructed and operable according to the teachings of the invention, is shown mounted on free end portion 34 of first draft link 26, adjacent to rear edge portion 18 of structural element 14, so as to be capable of moving upwardly and downwardly in relation thereto with the upward and downward movements of free end portion 34 of draft link 26. Sway restrictor 54 preferably includes a generally C-shaped bracket 56 of suitable heavy duty construction, such as of cast or forged metal. Bracket 56 has a first leg portion 58, and a second leg portion 60 spaced sidewardly from leg portion 58, defining a space 62 therebetween. In this way, bracket 56 extends or wraps partially around rear edge portion 18 of structural element 14, for limiting the amount of side-to-side relative movement therebetween denoted by arrow B in FIG. 4. Such side-to-side movement B will be generally about perpendicular to the forward direction, as denoted by arrow A in FIG. 1. With rear edge portion 18 of structural element 14 cooperatively received in space 62, an inner surface 64 of first leg portion 58 will face an outer or first side 66 of structural element 14, and an inner surface 68 of second leg portion 60 will face an opposite second side 70 of structural element 14. As a result, relative side-to-side movements of draft link 16 and structural element 14 will be limited to the amount, if any, that the sideward extent of space 62 is larger than the sideward extent of structural element 14 between sides 66 and 70 thereof. To provide an ability to vary and substantially limit relative sideward movement of structural element 14 and draft link 26, and also to increase the durability of sway restrictor 54, at least one of leg portions 58 and 60, and preferably both, include a wear pad positioned to bear against the adjacent side of structural element 14, as illustrated by wear pads 72 and 74 in FIG. 4. Wear pad 72 of first leg portion 58 is preferably located in a sidewardly extending passage 76 in and preferably through leg portion 58, so as to extend into space 62 in a position to bear against first side 66 of structural element 14. Similarly, wear pad 74 is disposed in a cavity 78 in inner surface 68 of second leg portion 60 and extends sidewardly into space 62 to bear against second side 70 of structural element 14. As an additional wear reducing feature, sides 66 and 70 of structural element 14 preferably include elongate, arcuate shape wear plates 80 and 82 thereon, respectively, positioned for contact with wear pads 72 and 74, respectively, along the extent of vertical travel of draft link 26 relative to structural element 14.

Also preferably, an adjusting element 84 is provided for adjusting a sideward position or amount of extension of wear pad 72 into space 62. Adjusting element 84 preferably comprises a threaded member threadedly received in a threaded hole 86 through draft link 26, and bears against a backing plate 88 disposed between wear pad 72 and adjusting element 84. A locking nut 90 is threadedly engaged with adjusting element 84 and can be brought to bear against draft link 26 for holding adjusting element 84 and wear pad 72 in a desired position. Here, referring particularly to FIG. 4, it can be observed that virtually no space or gap exists between wear pad 72 and plate 80, and wear pad 74 and plate 82, such that little or no sideward swaying of draft link 26 will be allowed, while vertical relative movement through the anticipated range of vertical positions of draft link 26 will be allowed, as generally illustrated in FIG. 1 by the upward extent of wear plate 80 above draft link 26. Suitable materials of construction of wear pads 72 and 74 can include, but are not limited to, well known, commercially available glass filled plastics, lubricant impregnated metallic materials, and sintered materials, it being recognized that other materials, such as low friction ceramics, and the like, can also be used. Plates 80 and 82 are preferably constructed of steel.

Sway restrictor 54 is suitably mounted in connection with draft link 26, here, by a pair of bolts 92 which pass through holes 94 through draft link 26 and are threadedly received in threaded holes 96 in first leg portion 58 of bracket 56. Other means of attachment, including by welding, and also other methods, such as casting or otherwise forming in place, and the like, can also be used.

Figure 5:
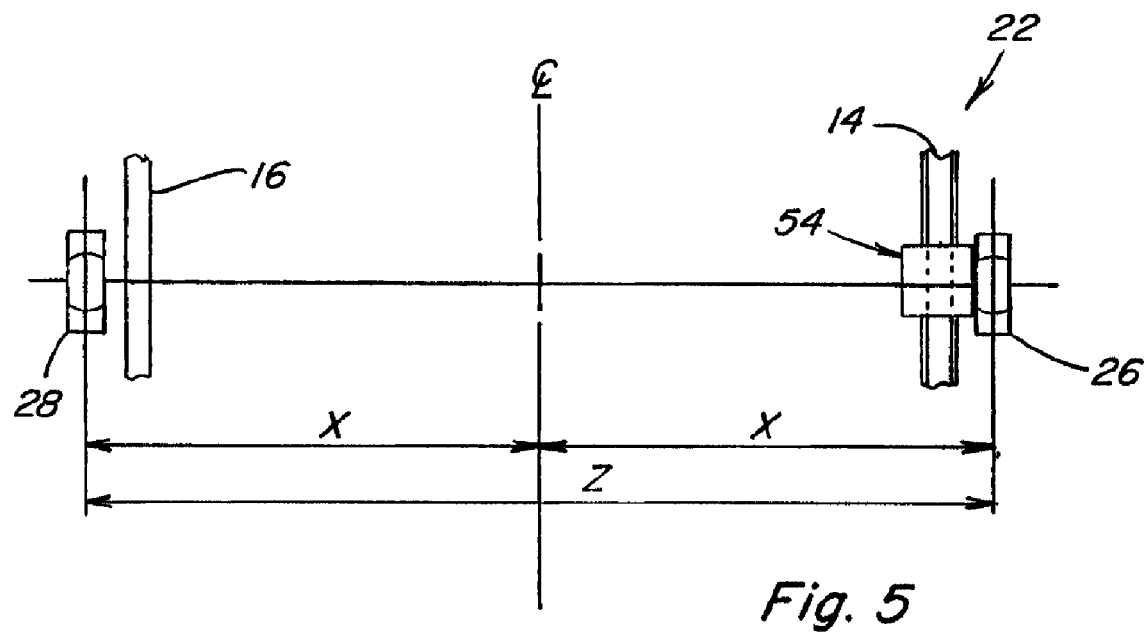
FIG. 5 is a simplified schematic rear view of the hitch and restrictor, with the hitch in a horizontal, non-tilted orientation.

Turning also to FIGS. 5 and 6, in FIG. 5, draft links 26 and 28 of three point hitch 22 are shown in a generally horizontal configuration beside structural elements 14 and 16, respectively. In this view, it can be observed that the centers of each of draft links 26 and 28 are located a distance X from a center line of the work machine on which the hitch is mounted. Distance X is shown here also being equal to a distance Z between centers of the draft links at their points of attachment to the scraper or other implement or tool, as held constant by such attachment. Sway restrictor 54 of the invention is shown mounted on draft link 26 and in cooperative engagement with structural element 14. In FIG. 6, hitch 22 is shown sidewardly tilted such that draft link 28 has been lowered below draft link 26. It can be observed here that sway restrictor 54 has maintained draft link 26 at distance X from the center line, whereas lowered draft link 28 has followed an arcuate line 52 so as to now be a distance X-n from the center line. Distance Z remains constant. As a result, it should be apparent that using sway restrictor 54, draft link 26 is able to move upwardly and downwardly along a straight line to thereby prevent any substantial sideward swaying thereof, and also of a tool or implement such as scraper 24 (FIG. 1) mounted thereon, while draft link 28 is permitted to move sidewardly as required to accommodate tilting movements such as that illustrated in FIG. 6.

Here, it should be appreciated that such sway restricting capabilities are accomplished with a sway restrictor illustrated by restrictor 54, which is of robust, strong construction, yet which is relatively compact and simple, particularly to set up and adjust. Additionally, it should be appreciated that a sway restrictor of the invention, such as sway restrictor 54, can be utilized with a draft link on either side of a three point hitch, and has utility for hitches located on both the front and rear of a work machine such as a tractor or the like. Still further, adjustments, for instance, to compensate for wear of the wear pads, or for setting a desired amount of permitted sway, are easily and simply accomplished, utilizing adjusting element 84.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A sway restrictor connected to a draft link of a three point hitch, comprising:
    a generally C shaped bracket having a first leg portion and a second leg portion spaced from the first leg portion, the leg portions defining a space therebetween adapted for cooperatively receiving an upwardly and downwardly extending structural element of a work machine therein such that an inner surface of the first leg portion faces a first side of the structural element and an inner surface of the second leg portion faces a second side of the structural element opposite the first side,
    at least the first of the leg portions having a passage therein extending in a transverse direction generally toward the other of the leg portions and in connection with the space;
    at least one mounting element mounted on the draft link of the three point hitch mounted on a work machine such that the structural element thereof will be cooperatively received in the space and the first leg portion configured for receiving the mounting element;
    a wear pad disposed in the passage so as to be extendible in the transverse direction into the space out of the passage and at least a portion of the wearpad is retractable into the passage by an adjustable element; and
    the adjusting element coupled to the first leg portion and disposed in connection with the wear pad and adjustably movable in cooperation with the wear pad for adjustably holding the wear pad in a position extending from within the passage into the space, for restricting relative transverse movement of the draft link and the structural element cooperatively received in the space; and
    the first leg portion is connected to the draft link and the adjusting element is threadedly mounted in a threaded hole through the draft link and is threadedly movably inwardly and outwardly in relation thereto for adjustably moving the wear pad.

2. The sway restrictor of claim 1, wherein the other of the leg portions includes a wear pad mounted partially within a second passage on the inner surface thereof positioned to abut the second side of the structural element.

3. The sway restrictor of claim 1 wherein the C shaped bracket is configured to receive a portion of the structural element having a wear plate on at least one of the sides of the structural element.

4. The sway restrictor of claim 3, wherein the C-shaped bracket is configured to receive a portion of the structural element having wear pads on each of the sides of the structural element.

5. The sway restrictor of claim 1, wherein the mounting element is mounted on a flat surface of the draft link, and the adjusting element is connected to a back plate that is restricted to travel within the passage, the back plate positioned to bear against the wear pad.

* * * * *